(12) United States Patent
Schroeder (10) Patent No.: US 12,405,149 B2
(45) Date of Patent: Sep. 2, 2025

(54) SYSTEMS AND METHODS FOR DETECTING FILL-LEVELS IN CROP TRANSPORT RECEPTACLES

(71) Applicant: CNH Industrial America LLC, New Holland, PA (US)

(72) Inventor: Brittany Schroeder, Lowell, IN (US)

( * ) Notice: Subject to any disclaimer, the term of this patent is extended or adjusted under 35 U.S.C. 154(b) by 901 days.

(21) Appl. No.: 17/552,838

(22) Filed: Dec. 16, 2021

(65) Prior Publication Data

US 2023/0194326 A1   Jun. 22, 2023

(51) Int. Cl.
| | | |
|---|---|---|
| *A01D 41/127* | (2006.01) | |
| *A01D 90/02* | (2006.01) | |
| *G01F 23/00* | (2022.01) | |
| *G01F 23/14* | (2006.01) | |
| *G01F 23/284* | (2006.01) | |

(52) U.S. Cl.
CPC ......... *G01F 23/284* (2013.01); *A01D 41/127* (2013.01); *A01D 90/02* (2013.01); *G01F 23/14* (2013.01)

(58) Field of Classification Search
CPC .............. A01D 41/127; A01D 41/1208; A01D 41/1275; A01D 90/02; G01F 23/14; G01F 23/18; G01F 23/284
See application file for complete search history.

(56) References Cited

U.S. PATENT DOCUMENTS

| | | |
|---|---|---|
| 7,877,181 B2 | 1/2011 | Chervenka et al. |
| 8,032,255 B2 | 10/2011 | Phelan et al. |
| 9,085,381 B2 | 7/2015 | Gengerke |
| 10,015,928 B2 * | 7/2018 | Nykamp ............... A01D 43/073 |
| 2019/0322461 A1 * | 10/2019 | Banthia .................... B60P 1/56 |
| 2020/0022305 A1 * | 1/2020 | Gould ................ A01D 41/1208 |
| 2022/0019240 A1 * | 1/2022 | Christiansen ...... A01D 41/1275 |

FOREIGN PATENT DOCUMENTS

| | | |
|---|---|---|
| EP | 2944178 B1 | 6/2018 |
| JP | 2015-204806 A | 11/2015 |

OTHER PUBLICATIONS

Jennett, "Decision Support System for Sensor-Based Autonomous Filling of Grain Containers," thesis, Iowa State University, Ames, Iowa, 2012 (142 pages) https://dr.lib.iastate.edu/entities/publication/30302155-8893-43c1-80b6-72885f13a0b1.

* cited by examiner

Primary Examiner — Joseph M Rocca
Assistant Examiner — Robert E Pezzuto
(74) Attorney, Agent, or Firm — Rickard K. DeMille; Rebecca L. Henkel (57) ABSTRACT

In one aspect, a system for monitoring crop fill-levels of transport receptacles, includes a crop transport receptacle defining a storage volume including at least a first sub-region and a second sub-region. The system also includes first and second fill-level sensors having fields of view directed towards harvested crops contained within the first and second sub-regions of the storage volume, respectively. In addition, the system includes a computing system configured to determine a first fill-level value associated with a fill-level of the first sub-region based on data received from the first fill-level sensor and a second fill-level value associated with a fill-level of the second sub-region based on data received from the second fill-level sensor. The computing system is further configured to determine an estimated fill-level value associated with at least a portion of the storage volume including the sub-regions based on the first and second fill-level values.

20 Claims, 5 Drawing Sheets

SYSTEMS AND METHODS FOR DETECTING FILL-LEVELS IN CROP TRANSPORT RECEPTACLES

FIELD OF THE INVENTION

The present disclosure relates generally to crop transport receptacles and related transport vehicles for receiving crops during an unloading operation performed in association with a harvester and, more particularly, to systems and methods for detecting the fill-level of a crop transport receptacle.

BACKGROUND OF THE INVENTION

Harvesters or harvesting machines pick up crop material, treat the crop material, e.g., remove any undesirable portions or residue, and discharge the crop material. Harvesters can discharge the crop material, either continuously as with a forage harvester or after intermediate storage as with a combine harvester, to a transport or transfer vehicle. The transport vehicle may be a tractor or truck pulling a cart, wagon, or trailer, or a truck or other vehicle capable of transporting harvested crop material. The harvested crop material is loaded into the transport vehicle via a crop discharging or unloading device, such as a spout or discharge auger, associated with the harvester.

During the performance of an unloading operation from a harvester to a transport vehicle, it is generally desirable to monitor the fill-level of the associated receptacle of the transport vehicle. In this regard, various vision-based systems have been proposed that utilize cameras to capture images of the harvested crops within the receptacle and then subsequently employ computer-vision techniques to process the images in an attempt to calculate or estimate the fill-level of the receptacle. However, such vision-based systems are often very complex and expensive and typically require significant computing resources to process and analyze the images in an efficient manner, particularly for "on-the-go" unloading operations.

Accordingly, systems and methods for monitoring the fill-level of a crop transport receptacle that address one or more of the issues present in the prior art would be welcomed in the technology, including, for example, systems and methods that provide a simpler (e.g., including less resource intensive) and/or more cost effective means for monitoring the fill-level within crop transport vehicles or receptacles.

SUMMARY OF THE INVENTION

Aspects and advantages of the technology will be set forth in part in the following description, or may be obvious from the description, or may be learned through practice of the technology.

In one aspect, the present subject matter is directed to a system for monitoring crop fill-levels of transport receptacles. The system includes a crop transport receptacle defining a storage volume configured to receive harvested crops, with the storage volume including at least a first sub-region and a second sub-region. The system also includes a first reflection-based fill-level sensor supported relative to the storage volume such that the first fill-level sensor has a field of view directed towards harvested crops contained within the first sub-region of the storage volume, and a second reflection-based fill-level sensor supported relative to the storage volume such that the second fill-level sensor has a field of view directed towards harvested crops contained within the second sub-region of the storage volume. In addition, the system includes a computing system communicatively coupled to the first and second fill-level sensors. The computing system is configured to determine a first fill-level value associated with a fill-level of the first sub-region based on data received from the first fill-level sensor and a second fill-level value associated with a fill-level of the second sub-region based on data received from the second fill-level sensor. The computing system is further configured to determine an estimated fill-level value associated with at least a portion of the storage volume including the first and second sub-regions based on the first and second fill-level values.

In another aspect, the present subject matter is directed to a system for monitoring crop fill-levels of transport receptacles. The system includes a crop transport receptacle defining a storage volume configured to receive harvested crops. The system also includes a primary fill-level sensor supported relative to the storage volume such that the primary fill-level sensor has a field of view directed towards harvested crops contained within the storage volume of the crop transport receptacle, and a secondary fill-level sensor supported relative to the storage volume such that the secondary fill-level sensor is configured to detect when the harvested crops have reached an initial fill-level within the storage volume. In addition, the system includes a computing system communicatively coupled to both the primary fill-level sensor and the secondary fill-level sensor. The computing system is configured to determine whether the harvested crops have reached the initial fill-level based on data received from the secondary fill-level sensor. The computing system is further configured to activate the primary fill-level sensor to allow a fill-level value associated with a fill level of the storage volume to be determined based on data received from the primary fill-level sensor upon determining that the harvested crops have reached the initial fill level.

In a further aspect, the present subject matter is directed to a method for monitoring a crop fill-level of a transport receptacle, the transport receptacle defining a storage volume including a first sub-region and a second sub-region. The method includes receiving, with a computing system, data from a first fill-level sensor supported relative to the storage volume such that the first fill-level sensor has a field of view directed towards harvested crops contained within the first sub-region of the storage volume, and receiving, with the computing system, data from a second fill-level sensor supported relative to the storage volume such that the second fill-level sensor has a field of view directed towards harvested crops contained within the second sub-region of the storage volume. The method also includes determining, with the computing system, a first fill-level value associated with a fill-level of the first sub-region based on data received from the first fill-level sensor, determining, with the computing system, a second fill-level value associated with a fill-level of the second sub-region based on data received from the second fill-level sensor, and determining, with the computing system, an estimated fill-level value associated with at least a portion of the storage volume including the first and second sub-regions based on the first and second fill-level values.

In yet another aspect, the present subject matter is directed to a method for monitoring a crop fill-level of a transport receptacle, the transport receptacle defining a storage volume and including primary and secondary fill-level sensors supported relative to the storage volume. The method includes receiving, with a computing system, data from the secondary fill-level sensor indicative of harvested crops within the storage volume reaching an initial fill-level within the transport receptacle, and activating, with the computing system, the primary fill-level sensor upon determining that the harvested crops have reached the initial fill-level value. The method also includes receiving, with the computing system, data from the primary fill-level sensor associated with a fill-level of the storage volume, and determining, with the computing system, a fill-level value associated with the fill-level of the storage volume based on data received from the primary fill-level sensor.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for monitoring the fill-level of crop transport receptacles, such as the fill-level of a receptacle associated with a transport vehicle that is configured to receive harvested crops from a harvester during the performance of an unloading operation. In several embodiments, the system may include one or more fill-level sensors provided in association with a crop transport receptacle and a computing system communicatively coupled to the fill-level sensor(s) for monitoring the fill-level of the receptacle based on the data received from the sensor(s).

In accordance with aspects of the present subject matter, the system may include a plurality of reflection-based fill-level sensors provided in association with a crop transport receptacle. Specifically, in several embodiments, each fill-level sensor may have a field of view directed towards a different area within the crop transport receptacle. In such embodiments, by providing fill-level sensors with fields of view directed towards different sub-regions a given storage zone of the storage volume, the data provided by the fill-level sensors can be analyzed to estimate an overall fill-level of the associated storage zone.

Moreover, in accordance with other aspects of the present subject matter, the disclosed system may include one or more primary fill-level sensors and one or more secondary fill-level sensors provided in association with a crop transport receptacle. In several embodiments, the secondary fill-level sensor(s) may be used to determine when to activate the primary fill-level sensor(s). For example, in one embodiment, the secondary fill-level sensor(s) may be configured to indicate when harvested crops have reached an initial or threshold fill-level within the transport receptacle. Upon making such a determination, the primary fill-level sensor(s) can be activated to allow fill-level determination to be made thereafter based on the data from the primary fill-level sensor(s).

Figure 1:
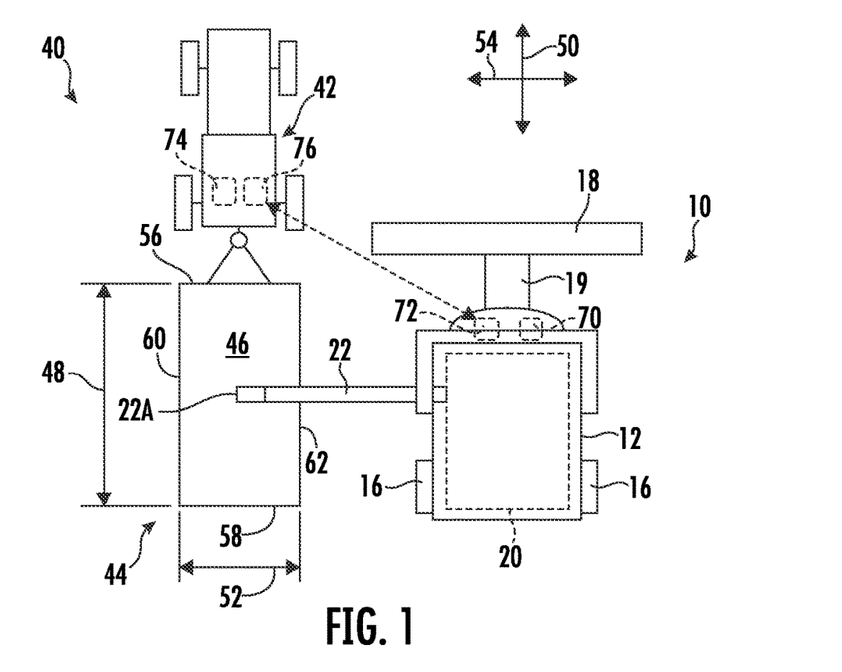
FIG. 1 illustrates a schematic top view of one embodiment of a harvester and a transport vehicle during an unloading operation in accordance with aspects of the present subject matter.
Figure 2:
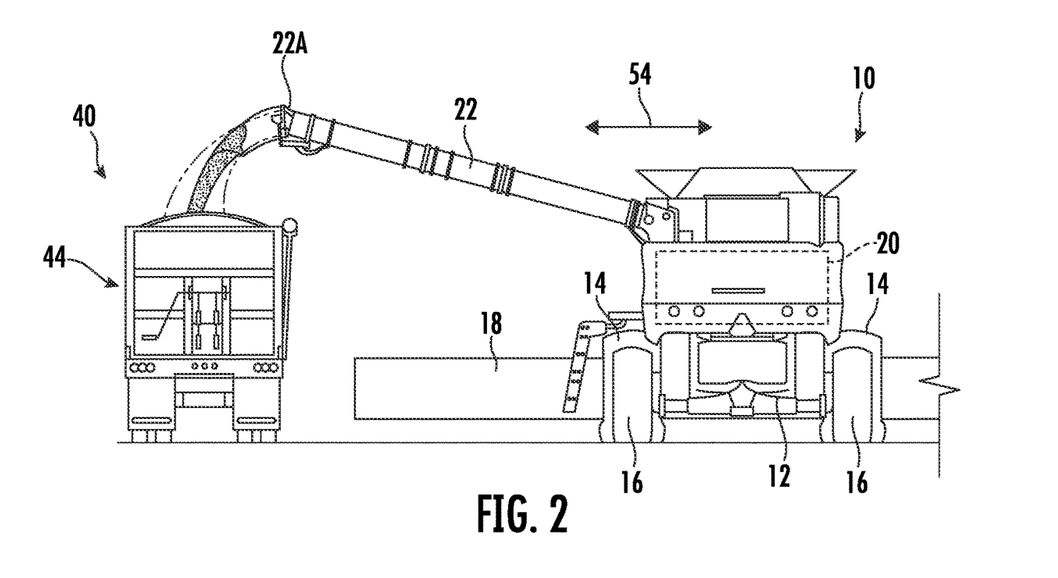
FIG. 2 illustrates a rear view of one embodiment of a harvester and a transport vehicle during an unloading operation in accordance with aspects of the present subject matter.

Referring now to FIGS. 1 and 2, respective top and rear views of a harvester 10 and a transport vehicle 40 during the performance of an unloading operation are illustrated in accordance with aspects of the present subject matter. As is generally understood, during a harvesting operation, crops harvested by the harvester 10 can be off-loaded immediately (e.g., in the case of forage harvesters) or temporarily stored within internal storage of the harvester (e.g., in the case of combine harvesters). Regardless, either immediately upon harvesting or after the internal storage is full or substantially full, an unloading operation is performed during which the harvested crops are unloaded from the harvester 10 to a transport vehicle 40. Such an unloading operation can be performed while the vehicles 10, 40 are stationary or can be performed "on-the-go" simultaneously with the performance of a harvesting operation. For instance, for on-the-go unloading operations, the transport vehicle 40 is typically brought into alignment with the harvester 10 such that the harvested crops can be unloaded from the harvester 10 while both vehicles 10, 40 are moving through the field. Such alignment typically includes maintaining desired offset distances between the harvester 10 and the transfer vehicle 40 (e.g., a desired lateral offset distance and/or a desired longitudinal offset distance) to ensure that the harvested crops can be properly unloaded from the harvester 10 and received by the transport vehicle 40.

In the illustrated embodiment, the harvester 10 is configured as a combine, such as an axial-flow type combine or any other suitable type of combine. In such an embodiment, the harvester 10 may include, for example, a chassis 12 and a plurality of ground engaging elements (e.g., front and rear wheels 14, 16) supporting the chassis 12 relative to the ground. In addition, the harvester 10 may include various components coupled to or supported by the chassis 12, including, but not limited to, a header 18, a feeder housing 19, an operator's cab (not shown), various internal crop processing systems and/or sub-systems (e.g., a threshing and separating system, a cleaning system, and/or the like), an internal crop storage tank 20, and an unloading tube or spout 22. The unloading spout 22 may, for example, be configured as an unloading auger, belt conveyor, chain elevator, and/or the like. Regardless of the type, the unloading spout 22 is generally configured to facilitate the transfer of harvested crops from the internal crop storage tank 20 to the transport vehicle 40 during the performance of an unloading operation. In other embodiments, it should be appreciated that the harvester 10 may have any other suitable harvester configuration, such as by being configured as a forage harvester.

In general, the transport vehicle 40 may include both a traction device 42 and a crop transport receptacle 44. As shown in the illustrated embodiment, the traction device 42 corresponds to a work vehicle, namely an agricultural tractor. However, in other embodiments, the traction device 42 may be a truck or other self-propelled vehicle sufficient to carry or tow the transport receptacle 44. Similarly, in the illustrated embodiment, the crop transport receptacle 44 corresponds to a wagon. However, in other embodiments, the transport receptacle 44 may be a grain cart, bin, or other similar storage/transport receptacle. In another embodiment, the transport vehicle 40 may be a semi-trailer truck, tractor-trailer or other similar self-propelled container vehicle.

As particularly shown in FIG. 1, the crop transport receptacle 44 may generally be configured to define a storage volume 46 for receiving/storing harvested crops. For instance, in the illustrated embodiment, the storage volume 46 has a length 48 extending in a longitudinal direction 50 between opposed front and rear walls 56, 58 of the transport receptacle 44 and a width 52 extending in a lateral direction 54 between opposed first and second sidewalls 60, 62 of the transport receptacle 44. During the performance of an unloading operation, the transport vehicle 40 is generally configured to be aligned relative to the harvester 10 such that harvested crops contained within the internal storage tank 20 of the harvester 10 can be directed through the unloading spout 22 and expelled there from into the storage volume 46 of the crop transport receptacle 44. Specifically, a discharge end 22A of the unloading spout 22 may generally be aligned with the transport receptacle 44 in the longitudinal and lateral directions 50, 54 such that harvested crops expelled from the spout 22 are received within the storage volume 46 of the receptacle 44. In this regard, to maintain the desired relative positioning between the discharge end 22A of the unloading spout 22 and the transport receptacle 44 during an on-the-go unloading operations, various aspects of the operation of one or both of the vehicles 10, 40 can be manually or automatically controlled/adjusted, such as by adjusting the speed and/or steering of the harvester 10 and/or the transport vehicle 40. In addition, the unloading spout 22 can be actuated to adjust the position/orientation of the spout 22 relative to the transport receptacle 44, such as by actuating the spout 22 to adjust the longitudinal position of the discharge end 22A relative to the front and rear walls 56, 58 of the receptacle 44 and/or to adjust the lateral position of the discharge end 22A relative to the first and second sidewalls 60, 62 of the receptacle 44.

Additionally, in several embodiments, both the harvester 10 and the transport vehicle 40 may include on-board computing systems and associated wireless communications devices. For instance, as shown in FIG. 1, the harvester 10 may include a harvester-based computing system 70 and wireless communications device 72, while the transport vehicle 40 may include a transport-based computing system 74 and wireless communications device 76. In such embodiments, the vehicles 10, 40 may be equipped for vehicle-to-vehicle communications, for example, by allowing data, including information, requests, instructions, control signals, and/or the like, to be transmitted between the on-board computing systems 70, 74 via the associated wireless communications devices 72, 76. As will be described below, such data may, for instance, correspond to sensor data associated with the fill-level of the crop transport receptacle 44, including data associated with the overall fill-level of the transport receptacle 44 and/or data associated with the fill-level of individual zones or regions of the transport receptacle 44.

Figure 3:
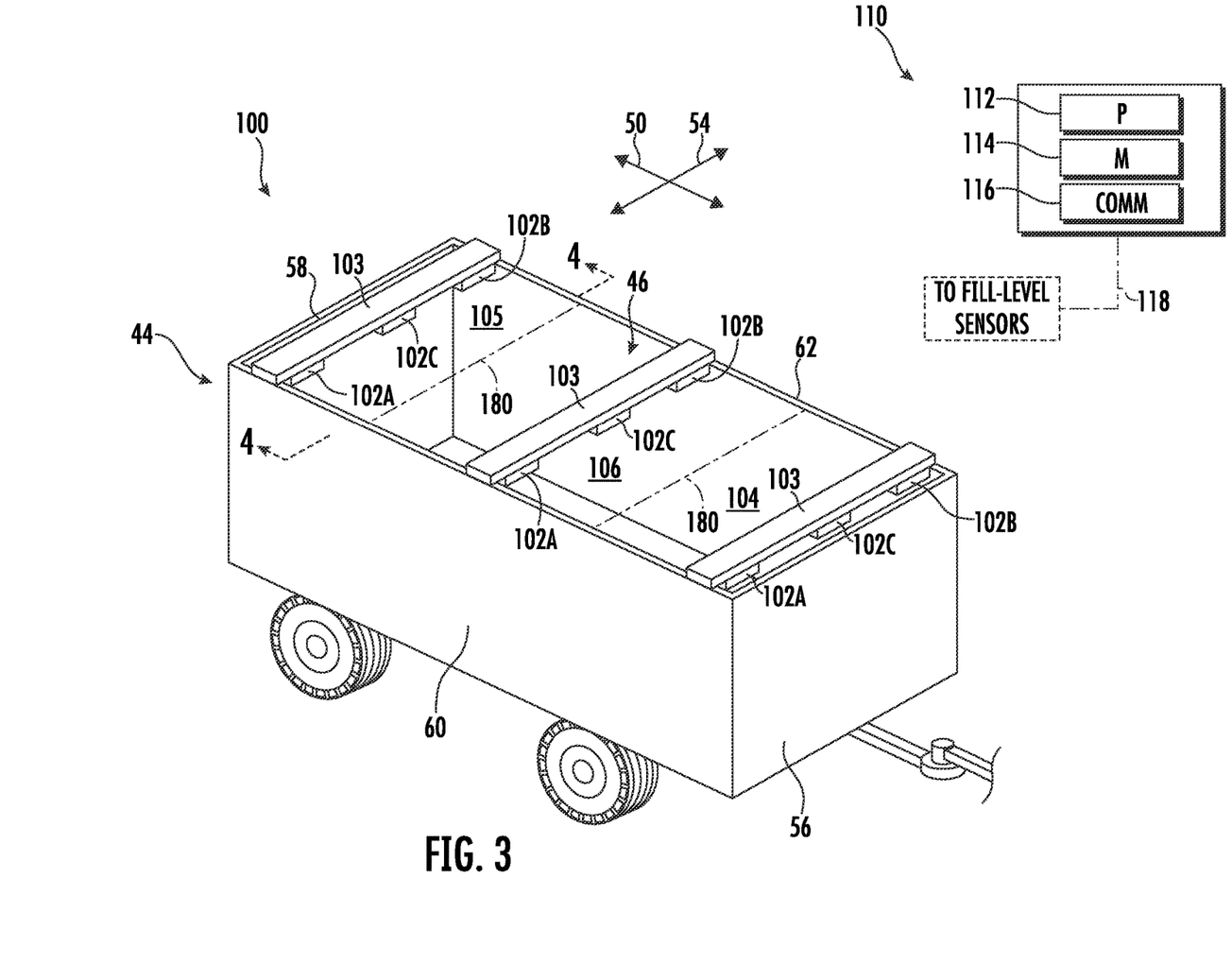
FIG. 3 illustrates a schematic view of one embodiment of a system for monitoring the fill-level of a crop transport receptacle in accordance with aspects of the present subject matter.

Referring now to FIG. 3, a schematic view of one embodiment of a system 100 for monitoring the fill-level of a crop transport receptacle is illustrated in accordance with aspects of the present subject matter. For purposes of discussion, the system 100 will generally be described with reference to the crop transport receptacle 44 and related transport vehicle 40 shown in FIGS. 1 and 2. However, in other embodiments, the disclosed system 100 may be configured for use with transport receptacles having any other suitable configuration, including transport receptacles provided in association with any other suitable traction device and/or forming part of any other suitable transport vehicle.

As shown in FIG. 3, the system 100 includes a crop transport receptacle (e.g., the receptacle 44 described above with reference to FIGS. 1 and 2) and one or more fill-level sensors 102 provided in operative association with the transport receptacle 44. In general, each fill-level sensor 102 is configured to generate data associated with the fill-level of all or a portion of the receptacle 44. For instance, in one embodiment, each fill-level sensor 102 may be configured to generate data associated with the overall fill-level of the receptacle 44. In addition to such data (or as an alternative thereto), each fill-level sensor 102 may be configured to generate data associated with a localized fill-level of the receptacle 44, such as the fill-level within a given zone or region of the receptacle 44. For example, the storage volume 46 of the transport receptacle 44 may, in certain embodiments, be sub-divided into separate zones or regions. In such embodiments, the fill-level of each individual zone or region defined within the transport receptacle 44 may be monitored via one or more respective fill-level sensors 102.

For instance, in the embodiment shown in FIG. 3, the storage volume 46 is sub-divided into three longitudinal regions or zones (e.g., as divided by the dashed lines 180 shown in FIG. 3), namely a forward storage zone 104, a rear storage zone 105, and central longitudinal storage zone 106. As such, one or more fill-level sensors 102 may be provided in association with each respective storage zone 104, 105, 106 to monitor the fill-level of such zone. For example, as shown in FIG. 3, a set of three fill-level sensors (e.g., sensors 102A, 102B, 102C) is provided in association with each zone 104, 105, 106 for generating data associated with the zone's fill-level. As will be described below, the various sensors 102A, 102B, 102C provided in association with each longitudinal storage zone 104, 105, 106 may be also configured to individually generate data associated with a respective lateral sub-region within such storage zone. It should be appreciated that, although a set of three fill-level sensors (e.g., sensors 102A, 102B, 102C) is shown as being associated with each longitudinal storage zone 104, 105, 106, the system 100 may, in other embodiments, only include two or less fill-level sensors 102 (including a single fill-level sensor 102) associated with a given longitudinal storage zone or may include four or more fill-level sensors 102 associated with a given longitudinal storage zone.

In several embodiments, each fill-level sensor 102 may correspond to a reflection-based fill-level sensor supported relative to the storage volume 46 of the crop transport receptacle 44. As used herein, a reflection-based sensor generally refers to a sensor configured to transmit signals or waves (e.g., radio waves, light waves, sound waves, etc.) for reflection off of a surface (e.g., a surface of crop materials) and subsequently receive return signals or waves (e.g., as reflected off the surface) to allow a distance between the sensor and such surface to be estimated or determined. Thus, the reflection-based fill-level sensors 102 may correspond, for instance, to radar sensors, sonar sensors, ultrasound sensors, LIDAR sensors, and/or the like. Regardless, each reflection-based fill-level sensor 102 may be configured to transmit waves towards the harvested crops accumulating within the transport receptacle 44 and subsequently detect the return waves as reflected off the top surface of the accumulated crops to determine the distance between the sensor 102 and the top surface of the accumulated crops, which can then be used to calculate or estimate the fill-level of the receptacle 44.

It should be appreciated that the fill-level sensors 102 may be supported relative to the storage volume 46 of the transport receptacle 44 in any suitable manner that allows each sensor 102 to have a field of view directed towards the storage volume 46 (and, in particular, directed towards any crops contained within the storage volume 46). For instance, as shown in FIG. 3, each set of sensors (e.g., sensors 102A, 102B, 102C) is supported relative to the storage volume 46 via a support member 103 coupled to the transport receptacle 44, such as a beam or bracket coupled at opposed ends to the first and second sidewalls 60, 62 of the receptacle 44 and extending lengthwise therebetween. In such an embodiment, the sensors 102A, 102B, 102C of each sensor set may be coupled to the support member 103 at a suitable location along its length. Alternatively, the fill-level sensors 102 may be supported relative to the storage volume 46 in any other suitable manner, such as by being coupled directly or indirectly to one or more of the walls 56, 58, 60, 62 of the transport receptacle 44.

Additionally, as shown in FIG. 3, the system 100 may also include a computing system 110 communicatively coupled to each fill-level sensor 102. In general, the computing system 110 may be configured to monitor the fill-level of the crop transport receptacle 44 based on data received from the fill-level sensors 102 (e.g., data indicative of the distance between each sensor(s) and the top surface of the harvested crops). For instance, the computing system 110 may include suitable algorithms, mathematical formulas or expressions, predetermination relationships, correlation tables, look-up tables, and/or other data stored within its memory that allows the computing system 110 to determine, calculate, or estimate the fill-level within all or a portion of the receptacle 44 based on the data received from the fill-level sensors 102.

In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like. For instance, the computing system 110 may include a communications module or interface 116 to allow the computing system 110 to communicate with any of the various other system components described herein, such as the fill-level sensors 102. Specifically, as shown schematically in FIG. 3, the communications module 116 may be communicatively coupled to each fill-level sensor 102 via one or more communicative links 118 to allow data to be transmitted from the fill-level sensors 102 to the computing system 110.

It should be appreciated that, in several embodiments, the computing system 110 may correspond to a stand-alone computing system configured to monitor the fill-level of the crop transport receptacle 44. In such embodiments, the computing system 110 may, for instance, be configured to communicate data related to the fill-level of the transport receptacle 44 to one or more separate computing systems, such as by communicating the data to the on-board computing system of an associated transport vehicle and/or harvester (e.g., on-board computing systems 70, 74 shown in FIG. 1). Additionally, in some embodiments, the computing system 110 may correspond to or form part of an existing on-board computing system, such as the on-board computing system of an associated transport vehicle (e.g., computing system 74 (FIG. 1)).

In several embodiments, based on the monitored fill-level of the crop transport receptacle 44, the computing system 110 may be configured to initiate one or more control actions during the performance of an unloading operation to adjust the operation of a related transport vehicle and/or harvester (e.g., the transport vehicle 40 and/or harvester 10 described above with reference to FIGS. 1 and 2). For instance, it may be desirable to fill the crop transport receptacle 44 according to a predetermined filling strategy, such as by filling the receptacle 44 front-to-back in the longitudinal direction 50, side-to-side on the lateral direction 54, or according to a specific zone-based filling scheme. In such instance, to implement the desired filling strategy, the relative position between the transport receptacle 44 and the unloading spout 22 (FIGS. 1 and 2) of the harvester 10 may be adjusted as different sections or zones of the receptacle 44 begin to fill-up (e.g., as monitored via the data from the fill-level sensors 102). In one embodiment, a transport-based control action may be executed to adjust the relative position between the transport receptacle 44 and the unloading spout 22, such as by adjusting the speed of the transport vehicle 40 (e.g., speeding up or slowing down) or by adjusting the heading of the transport vehicle 40 (e.g., by steering the vehicle 40 left or right relative to the harvester 10). In another embodiment, a harvester-based control action may be executed to adjust the relative position between the transport receptacle 44 and the unloading spout 22, such as by adjusting the speed of the harvester 10 (e.g., speeding up or slowing down), by adjusting the heading of the harvester 10 (e.g., by steering the harvester 10 left or right relative to the vehicle 10), or by implementing spout control to actuate the spout 22 relative to the remainder of the harvester 10.

It should be appreciated that the computing system 110 may be configured to initiate control actions to adjust the relative position between the transport receptacle 44 and the unloading spout 22 in any suitable manner. For instance, in one embodiment, control actions may be initiated by transmitting the fill-level sensor data (or the current fill-level as determined based on the sensor data) from the computing system 110 to a separate computing system (e.g., the on-board computing system(s) 70, 74 of the transport vehicle 40 and/or the harvester 10), at which point the separate computing system may be configured to process/analyze the sensor data and transmit control signals for executing a suitable control action(s) to make a desired adjustment(s) in the relative positioning between the transport receptacle 44 and the unloading spout 22, including the transmission of control signals associated with instructions or requests for executing the desired adjustments. In other embodiments, the computing system 110 may be configured to process/analyze the sensor data and subsequently transmit, itself, control signals for executing a suitable control action(s) to make a desired adjustment(s) in the relative positioning between the transport receptacle 44 and the unloading spout 22, including the transmission of control signals associated with instructions or requests for executing the desired adjustments.

Figure 4:
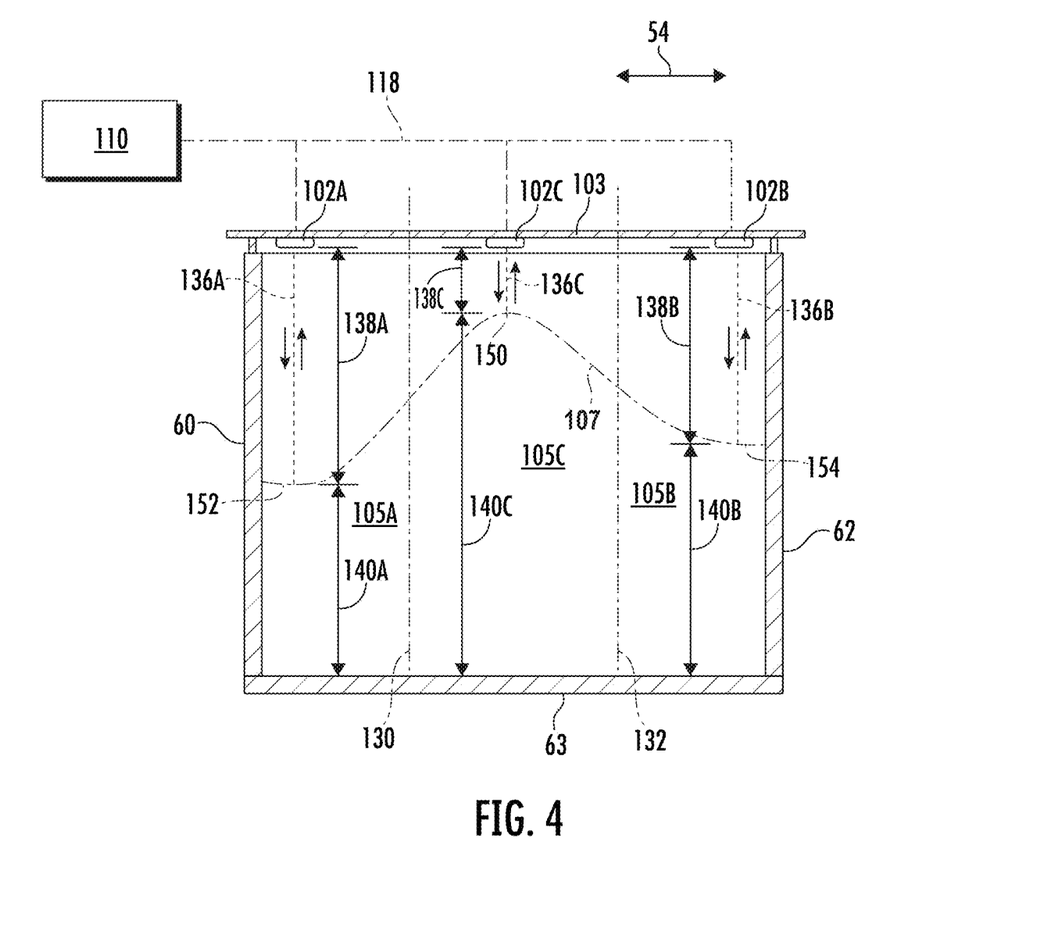
FIG. 4 illustrates a schematic, cross-sectional view of the crop transport receptacle shown in FIG. 3 taken about line 4-4, particularly illustrating one embodiment of a set of reflection-based fill-level sensors that can be used to monitor the fill-level of the crop transport receptacle in accordance with aspect of the present subject matter.

Referring now to FIG. 4, a schematic, cross-sectional view of a portion of the crop transport receptacle 44 shown in FIG. 3 taken about line 4-4 is illustrated in accordance with aspects of the present subject matter, particularly illustrating an exemplary set of reflection-based fill-level sensors 102 for monitoring the fill-level of the receptacle 44. Specifically, FIG. 4 illustrates the set of fill-level sensors 102A, 102B, 102C associated with the rear storage zone 105 of the crop transport receptacle 44 shown in FIG. 3. However, it should be appreciated that the subject matter described with reference to FIG. 4 is also applicable to the sensor sets associated with the other storage zones of the crop transport receptacle 44 (e.g., the front and central longitudinal storage zones 104, 106).

In several embodiments, the various fill-level sensors 102A, 102B, 102C may be supported relative to the internal storage volume 46 so that each fill-level sensor 102A, 102B, 102C is configured to generate data associated with the fill-level with a given lateral sub-region of the transport receptacle 44. Specifically, as shown in FIG. 4, the rear longitudinal storage zone 105 has been sub-divided into three separate lateral sub-regions, namely a left or first lateral-sub-region 105A extending inwardly from the first sidewall 60 of the receptacle 44 in the lateral direction 54 (e.g., to dashed line 130), a right or second lateral-sub-region 105B extending inwardly from the second sidewall 62 of the receptacle 44 in the lateral direction 54 (e.g., to dashed line 132), and a central lateral sub-region 105C extending in the lateral direction 54 between the first and second lateral sub-regions 105A, 105B. In such an embodiment, the various sensors 102A, 102B, 102C of the sensor set may be spaced apart laterally from one another (e.g., across the length of the support member 103) such that each sensor 102A, 102B, 102C is configured to generate data associated with the fill-level within a respective lateral sub-region 105A, 105B, 105C. For example, as shown in FIG. 4, a first fill-level sensor 102A has a field of view (e.g., indicated by line 136A) directed towards the harvested crops contained within the first lateral sub-region 105A, a second fill-level sensor 102B has a field of view (e.g., indicated by line 136B) directed towards the harvested crops contained within the second lateral sub-region 102B, and a third fill-level sensor 102C has a field of view (e.g., indicated by line 136C) directed towards the harvested crops contained within the central lateral sub-region 105C. In such an embodiment, each fill-level sensor 102 may be configured to transmit waves towards the harvested crops contained within its respective lateral sub-region 105A, 105B, 105C and receive return waves as reflected off the surface of the crops (e.g., along the respective fields of view 136A, 136B, 136C as indicated by the arrows), thereby providing an indication of the distance between each fill-level sensor 102 and the top surface of the crops contained within its respective lateral sub-region 105A, 105B, 105C. For example, as shown in FIG. 4, based on the data received from the various fill-level sensors 102, the computing system 110 may be configured to determine a first distance 138A between the first fill-level sensor 102A and the crops contained within the first lateral sub-region 105A, a second distance 138B between the second fill-level sensor 102B and the crops contained within the second lateral sub-region 105B, and a third distance 138C between the third fill-level sensor 102C and the crops contained within the central lateral sub-region 105C. The computing system 110 may, in certain embodiments, then be configured to convert or correlate each crop-to-sensor distance to a fill-level of the respective lateral sub-region 105A, 105B, 105C, such as a corresponding fill height 140A, 140B, 104C within each respective lateral sub-region 105A, 105B, 105C based on the location of each sensor 102 relative to the transport receptacle 44 (e.g., an installed height of each sensor 102).

It should be appreciated that, in addition to allowing the computing system 110 to monitor the fill-level of each lateral sub-region 105A, 105B, 105C of the transport receptacle 44, the data provided by the various fill-level sensors 102 may also be used to calculate an overall fill-level of the associated storage zone of the transport receptacle 44 (e.g., the rear storage zone 105). For instance, in one embodiment, the various distances 138 (or fill heights 140) determined based on the data received from the sensors 102 can be averaged to determine an average distance (or fill height) for the associated storage zone, thereby allowing an average fill-level of the storage zone to be determined.

In another embodiment, the determined distances 138 (or fill heights 140) may be processed based on the expected profile of the crops contained within the transport receptacle 44 to calculate the overall fill-level of the associated storage zone of the transport receptacle 44. Specifically, in certain instances, it may generally be excepted expected that the accumulated crops will mound up within the central sub-regions of the transport receptacle 44 and exhibit lower fill levels within the first and second lateral sub-regions of the transport receptacle 44. For instance, a representative crop material fill line 107 is illustrated in FIG. 4 that provides an example fill-level within the crop transport receptacle 44, particularly illustrating the accumulated crops having a maximum height or peak 150 within the central sub-region 105C and reduced heights or valleys 152, 154 within the first and second lateral sub-regions 105A, 105B. In such an embodiment, to calculate the overall fill-level of the associated storage zone (e.g., the rear storage zone 105), the first and second distances 138A, 138B (or fill heights 140A, 140B) may be initially averaged to determine an average distance (or fill height) for the first and second lateral sub-regions 102A, 102B. The third distance 138C (or fill height 140C) associated with the peak 150 contained within the central sub-region 105C may then be averaged with the average distance (or fill height) determined for the first and second lateral sub-regions 105A, 105B to estimate the overall fill-level of the associated storage zone.

It should be appreciated that, although the embodiment of FIG. 3, has generally been described with reference to a set of three fill-level sensors 102, the system 100 may, in another embodiment, only include a set of two fill-level sensors 102 associated with each storage zone. In such an embodiment, it may be desirable to have one centrally located fill-level sensor to monitor the fill level within the central sub-region 105C (e.g., sensor 102C) and one fill-level sensor configured to monitor the fill-level within either the first or second lateral sub-region 105A, 105B (e.g., sensor 102A or sensor 102B). As such, the two distance measurements (or associated fill heights) derived from the fill-level sensors may then be averaged to estimate the overall fill-level of the associated storage zone.

Figure 5:
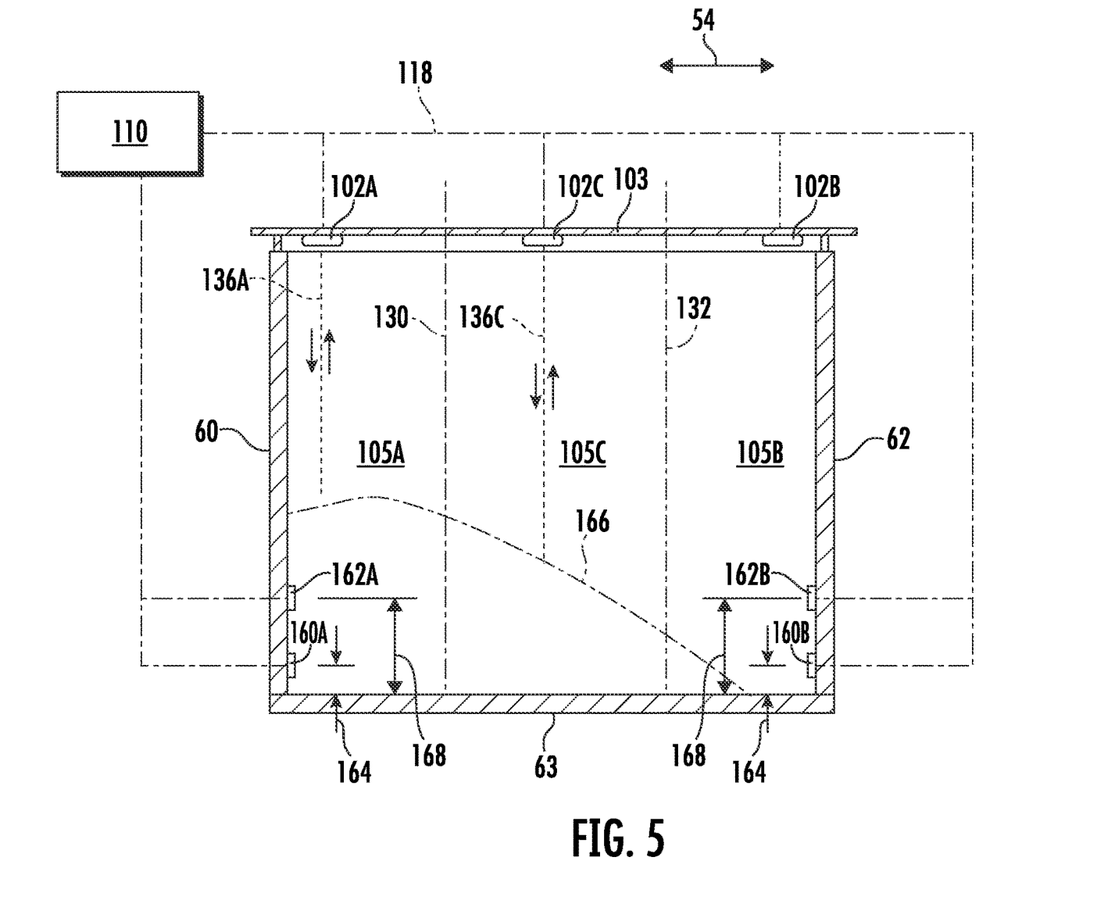
FIG. 5 illustrates a similar schematic, cross-sectional view of the crop transport receptacle as that shown in FIG. 4, particularly illustrating an embodiment of the system that utilized both primary and secondary fill-level sensors to monitor the fill-level of the crop transport receptacle in accordance with aspect of the present subject matter.

Referring now to FIG. 5, a similar schematic, cross-sectional view of the portion of the crop transport receptacle 44 shown in FIG. 4 is illustrated in accordance with aspects of the present subject matter, particularly illustrating another embodiment of the system 100 in which one or more secondary fill-level sensors 160, 162 are utilized as a basis for triggering the use of the reflection-based fill-level sensors 102 (also referred to herein as the "primary fill-level sensors"). Specifically, depending on the type of reflection-based fill-level sensors being used, such sensors may not function as desired when the transport receptacle 44 is empty or substantially empty in one or more regions of the receptacle 55. For instance, in embodiments in which a bottom wall 63 of the receptacle 44 is formed from metal or another material that tends to scatter the waves transmitted from the sensors (or that otherwise results in a significant amount of noise in the sensor data), the sensors may not be capable of accurately detecting that the fill-level of the receptacle 44 is in empty or near-empty conditions. In such embodiments, the disclosed secondary fill-level sensors 160, 162 may allow for a determination to be made as to when the transport receptacle 44 is sufficiently filled to permit the reflection-based fill-level sensors 102 to be subsequently used to detect the fill-level of the transport receptacle 44.

In several embodiments, each secondary fill-level sensor 160, 162 may correspond to a switch-based fill-level sensor positioned within the interior of the crop transport receptacle 44. For instance, each secondary fill-level sensor 160, 162 may be configured as a contact-based pressure switch positioned on an inner surface of the crop transport receptacle 44, such as the inner surface defined by one or more of the walls 56, 68, 60, 62 of the crop transport receptacle 44. In such an embodiment, by positioning each switch-based fill-level sensor 160, 162 at a given location within the crop transport receptacle 44, the sensor 160, 162 may be configured to detect when harvested crops begin to accumulate within the receptacle 44 at or adjacent to the location of the sensor 160, 162. For instance, when the harvested crops contact or push/press against a secondary fill-level sensor 160, 162 as the crops accumulate at or adjacent to the sensor 160, 162, an internal circuit of the switch-based sensor will close (or open), thereby providing a signal (or a lack thereof) as an indicator that the harvested crops have reached the level of the sensor 160, 162 within the receptacle 44. It should be appreciated that, as an alternative to switch-based sensors, the secondary fill-level sensors 160, 162 may correspond to any other suitable sensor or sensing device configured to provide an indication of the crop fill-level at or adjacent to the location of the sensor 160, 162, such as an optical sensor or proximity sensor.

As shown in FIG. 5, a pair of secondary fill-level sensors 160A, 160B are positioned at a location adjacent to the bottom wall 63 of the transport receptacle 44, such as by being spaced apart from the bottom wall 63 by a predetermined offset distance 164. Each of such secondary fill-level sensors 160A, 160B may be configured to detect when the fill-level of the harvested crops within each associated lateral sub-region of the transport receptacle 44 (e.g., the first and second lateral sub-regions 105A, 105B) has reached an initial fill-level associated with the location of the sensor 160A, 160B. In such an embodiment, the offset distance 164 may be selected such that, when the harvested crops have reached the location the secondary sensor 160A, 160B, it may be assumed the fill-level within the associated lateral sub-region 105A, 105B is sufficient to allow the respective reflection-based fill-level sensor 102A, 102B to be activated and begin to monitor the fill-level of such sub-region 150A, 105B. For instance, a representative crop material fill line 166 is illustrated in FIG. 5 that provides an example fill-level within the crop transport receptacle 44. With such a fill-level, the computing system 110 may determine that the first reflection-based fill-level sensor 102A may be activated based on the data received from the secondary fill-level sensor 160A indicating that the fill-level within the first lateral sub-region 105A has reached the height of such secondary sensor 160A. Additionally, given that the opposed secondary fill-level sensor 160B will not yet have indicated that the fill-level within the second lateral sub-region 105B has reached the height of such sensor 160B, the computing system 110 may determine that the second reflection-based fill-level sensor 102B may remain in a deactivated state.

Additionally, as shown in FIG. 5, in one embodiment, a second pair of secondary fill-level sensors 162A, 162B may be positioned at an increased height relative to the first pair of secondary fill-level sensors 160A, 160B, such as by being spaced apart from the bottom wall 63 by a second predetermined offset distance 168. Such secondary fill-level sensors 162A, 162B may, in certain embodiments, be used to determine when the third reflection-based fill-level sensor 102C may be activated. For instance, the second offset distance 168 may be selected such that, when the harvested crops have reached the height of one of such secondary sensors 162A, 162B, it may be assumed the fill-level within the central sub-region 105C is sufficient to allow the associated reflection-based fill-level sensor 102C to be activated and begin to monitor the fill-level of such sub-region 105C. Given the fill-level associated with the exemplary fill line 166, the computing system 110 may determine that the third reflection-based fill-level sensor 102C may be activated based on the data received from the secondary fill-level sensor 162A indicating that the fill-level within the first lateral sub-region 105A has reached the increased height of such secondary sensor 162A. Alternatively, in instances in which the third or central reflection-based fill-level sensor 102C is associated with one of the front or rear storage zones 104, 106 of the transport receptacle 44, a secondary fill-level sensor may be installed centrally on the front or rear wall 56, 58 of the transport receptacle 44, respectively, at a location adjacent to the bottom wall 63 (e.g., at the first offset distance 164) to determine when the fill-level within the central sub-region 105C is sufficient to activate the associated reflection-based fill-level sensor 102C.

Figure 6:
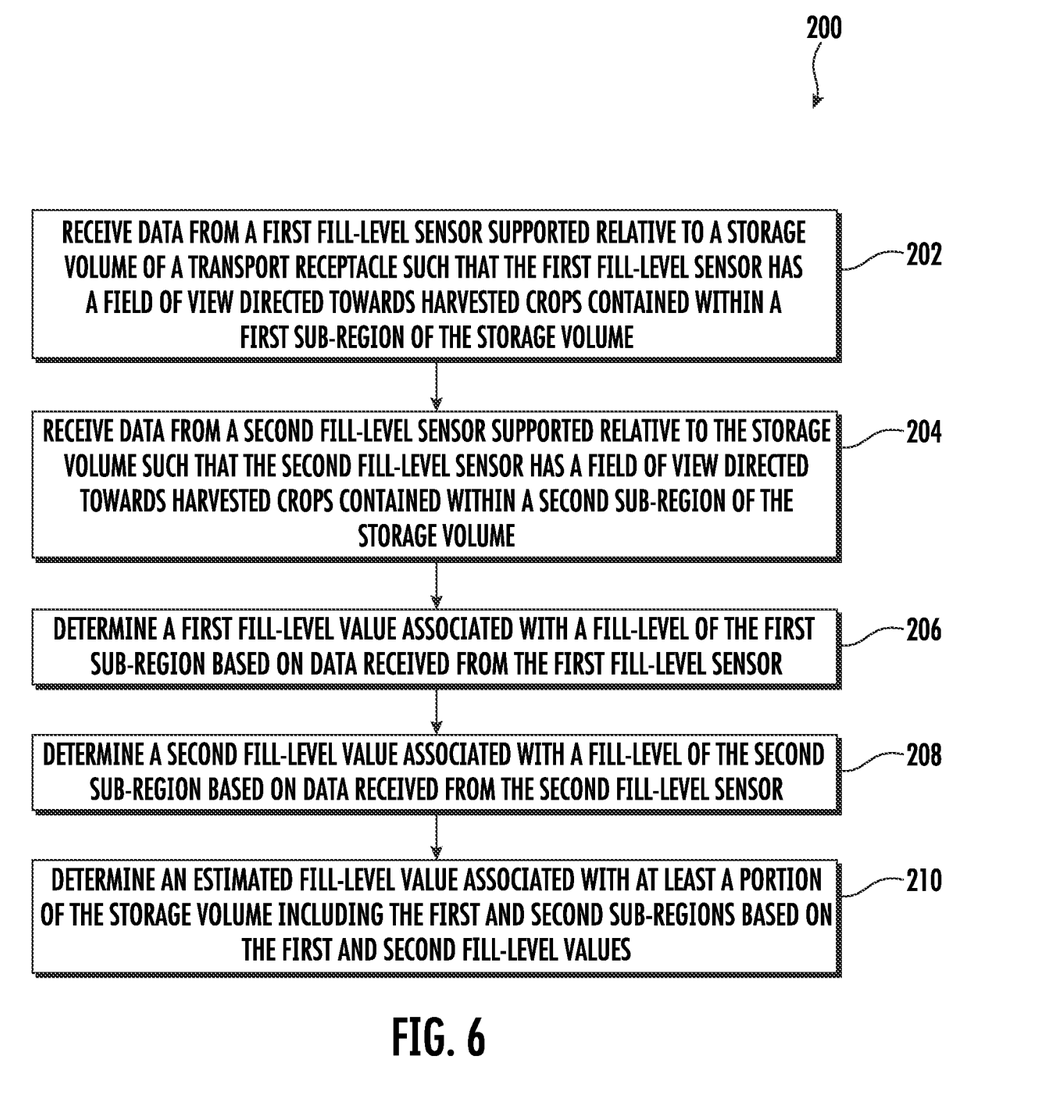
FIG. 6 illustrates a flow diagram of one embodiment of a method for monitoring the fill-level of a crop transport receptacle in accordance with aspects of the present subject matter.

Referring now to FIG. 6, a flow diagram of one embodiment of a method 200 for monitoring the fill-level of a crop transport receptacle is illustrated in accordance with aspects of the present subject matter. In general, the method 200 will be described herein with reference to the crop transport receptacle 44 and system 100 described above with reference to FIGS. 1-5. However, it should be appreciated by those of ordinary skill in the art that the disclosed method 200 may generally be utilized in association with transport receptacles having any suitable receptacle configuration and/or with systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202) and (204), the method 200 may include receiving data from a first fill-level sensor supported relative to a storage volume of a transport receptacle such that the first fill-level sensor has a field of view directed towards harvested crops contained within a first sub-region of the storage volume, and receiving data from a second fill-level sensor supported relative to the storage volume such that the second fill-level sensor has a field of view directed towards harvested crops contained within a second sub-region of the storage volume. Specifically, as indicated above, the computing system 110 may be communicatively coupled to a plurality of fill-level sensors 102 provided in association with a given transport receptacle 44. In such embodiments, each fill-level sensor 102 may, for instance, have a field of view directed towards a different sub-region of the storage volume 46 of the transport receptacle 44.

Additionally, at (206) and (208), the method 200 may include determining a first fill-level value associated with a fill-level of the first sub-region based on data received from the first fill-level sensor, and determining a second fill-level value associated with a fill-level of the second sub-region based on data received from the second fill-level sensor. For example, as indicated above, the computing system 110 may be configured to determine a sensor-to-crop distance or fill-height associated with the fill-level of each sub-region based on the data received from each respective fill-level sensor 102.

Moreover, at (210), the method 200 may include determining an estimated fill-level value associated with at least a portion of the storage volume including the first and second sub-regions based on the first and second fill-level values. Specifically, as indicated above, the computing system 110 may be configured to average the sensor-to-crop distances or fill-heights associated with different sub-regions to determine an estimated fill-level value of a larger volume that includes the different sub-regions, such as a storage zone of the crop transport receptacle that has been subdivided into various sub-regions.

It should also be appreciated that the disclosed method 200 may also include initiating a control action to adjust a relative position between an unloading spout of an associated harvester and the transport receptacle based on the estimated fill level. For instance, as indicated above, the computing system 110 may be configured to initiate a control action to adjust the relative positioning between the spout 22 and the receptacle 44 to ensure a desired distribution of the harvested crops within the receptacle 44 and/or to follow a predetermined fill strategy for the receptacle 44.

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring crop fill-levels of transport receptacles, the system comprising:
   a crop transport receptacle defining a storage volume configured to receive harvested crops, the storage volume including at least a first sub-region and a second sub-region;
   a support member coupled at opposed ends to a first wall of the crop transport receptacle and a second wall of the crop transport receptacle such that the support member extends lengthwise between the first wall and the second wall;

a first reflection-based fill-level sensor coupled to the support member such that the first fill-level sensor has a field of view directed towards harvested crops contained within the first sub-region of the storage volume;
a second reflection-based fill-level sensor coupled to the support member such that the second fill-level sensor has a field of view directed towards harvested crops contained within the second sub-region of the storage volume; and
a computing system communicatively coupled to the first and second fill-level sensors, the computing system being configured to determine a first fill-level value associated with a fill-level of the first sub-region based on data received from the first fill-level sensor and a second fill-level value associated with a fill-level of the second sub-region based on data received from the second fill-level sensor, the computing system being further configured to determine an estimated fill-level value associated with at least a portion of the storage volume including the first and second sub-regions based on the first and second fill-level values.

2. The system of claim 1, wherein:
the computing system is configured to average the first and second fill-level values to determine the estimated fill-level value.

3. The system of claim 1, wherein:
the storage volume further includes a central sub-region extending between the first and second sub-regions of the storage volume;
the system further includes a third fill-level sensor coupled to the support member such that the third fill-level sensor has a field of view directed towards harvested crops contained within the central sub-region of the storage volume;
the computing system is configured to determine a third fill-level value associated with a fill-level of the central sub-region based on data received from the third fill-level sensor; and
the computing system is further configured to determine the estimated value based on the first, second, and third fill-level values.

4. The system of claim 3, wherein:
the computing system is configured to average the first and second fill-level values to determine a reduced fill-level value associated with the first and second sub-regions; and
the computing system is configured to average the reduced fill-level value and the third fill-level value to determine the estimated fill-level value.

5. The system of claim 1, further comprising a secondary fill-level sensor configured to provide an indication of when the harvested crops are at an initial fill-level within the storage volume, the computing system being configured to activate one of the first fill-level sensor or the second fill-level sensor based on the data received from the secondary fill-level sensor.

6. The system of claim 5, wherein the secondary fill-level sensor is positioned within the storage volume of the crop transport receptacle at a predetermined offset distance relative to a bottom wall of the crop transport receptacle.

7. The system of claim 5, wherein the secondary fill-level sensor comprises a switch-based fill-level sensor.

8. The system of claim 1, at least one of the first fill-level sensor or the second fill-level sensor comprises one of a radar sensor, an ultrasound sensor, a sonar sensor, or a LIDAR sensor.

9. A system for monitoring crop fill-levels of transport receptacles, the system comprising:
a crop transport receptacle defining a storage volume configured to receive harvested crops;
a primary fill-level sensor supported relative to the storage volume such that the primary fill-level sensor has a field of view directed towards harvested crops contained within the storage volume of the crop transport receptacle;
a secondary fill-level sensor supported relative to the storage volume such that the secondary fill-level sensor is configured to detect when the harvested crops have reached an initial fill-level within the storage volume; and
a computing system communicatively coupled to both the primary fill-level sensor and the secondary fill-level sensor, the computing system being configured to determine whether the harvested crops have reached the initial fill-level based on data received from the secondary fill-level sensor, the computing system being further configured to, upon determining that the harvested crops have reached the initial fill-level, activate the primary fill-level sensor to allow a fill-level value associated with a fill level of the storage volume to be determined based on data received from the primary fill-level sensor.

10. The system of claim 9, wherein the primary fill-level sensor comprises a reflection-based fill-level sensor.

11. The system of claim 10, wherein the reflection-based fill-level sensor comprises one of a radar sensor, an ultrasound sensor, a sonar sensor, or a LIDAR sensor.

12. The system of claim 10, wherein the secondary fill-level sensor is positioned within the storage volume of the crop transport receptacle at a predetermined offset distance relative to a bottom wall of the crop transport receptacle.

13. The system of claim 9, wherein the secondary fill-level sensor comprises a switch-based fill-level sensor.

14. The system of claim 9, wherein:
the storage volume of the crop transport receptacle includes at least a first sub-region and a second sub-region;
the primary fill-level sensor comprises a first primary fill-level sensor supported relative to the storage volume such that the first primary fill-level sensor has a field of view directed towards harvested crops contained within the first sub-region of the storage volume;
the secondary fill-level sensor comprises a first secondary fill-level sensor configured to detect when the harvested crops have reached the initial fill-level within the first sub-region;
the system further comprises a second primary fill-level sensor supported relative to the storage volume such that the second primary fill-level sensor has a field of view directed towards harvested crops contained within the second sub-region of the storage volume;
the system further comprises a second secondary fill-level sensor configured to detect when the harvested crops have reached a second initial fill-level within the second sub-region.

15. The system of claim 14, wherein the computing system is configured to determine whether the harvested crops have reached the initial fill-level or the second initial fill-level based on data received from the first and second secondary fill-level sensors, respectively, the computing system being further configured to activate either the first primary fill-level sensor or the second primary fill-level sensor to allow a fill-level value associated with a fill level of the storage volume to be determined based on data received from the first primary fill-level sensor or the second primary fill-level sensor upon determining that the harvested crops have reached the initial fill-level or the second initial fill-level, respectively.

16. The system of claim 14, wherein the first and second primary fill-level sensors comprise reflection-based fill-level sensors.

17. A method for monitoring a crop fill-level of a transport receptacle, the transport receptacle defining a storage volume including a first sub-region and a second sub-region, a support member coupled at opposed ends to a first wall of the transport receptacle and a second wall of the transport receptacle such that the support member extends lengthwise between the first wall and the second wall, the method comprising:

receiving, with a computing system, data from a first fill-level sensor coupled to the support member such that the first fill-level sensor has a field of view directed towards harvested crops contained within the first sub-region of the storage volume;

receiving, with the computing system, data from a second fill-level sensor coupled to the support member such that the second fill-level sensor has a field of view directed towards harvested crops contained within the second sub-region of the storage volume;

determining, with the computing system, a first fill-level value associated with a fill-level of the first sub-region based on data received from the first fill-level sensor;

determining, with the computing system, a second fill-level value associated with a fill-level of the second sub-region based on data received from the second fill-level sensor; and determining, with the computing system, an estimated fill-level value associated with at least a portion of the storage volume including the first and second sub-regions based on the first and second fill-level values.

18. The method of claim 17, wherein the harvested crops are being received in the storage volume of the transport receptacle from a harvester during the performance of an unloading operation, the method further comprising initiating a control action to adjust a relative position between an unloading spout of the harvester and the transport receptacle based on the estimated fill-level value.

19. The method of claim 17,
wherein determining the estimated fill-level value comprises averaging the first and second fill-level values to determine the estimated fill-level value.

20. The method of claim 17, further comprising, prior to receiving data from at least one of the first fill-level sensor or the second fill-level sensor:

receiving, with a computing system, data from a first secondary fill-level sensor indicative of the harvested crops being at an initial fill-level within the storage volume;

activating the first fill-level sensor based on the data received from the first secondary fill-level sensor;

receiving, with a computing system, data from a second secondary fill-level sensor indicative of the harvested crops being at a second initial fill-level within the storage volume; and activating the second fill-level sensor based on the data received from the second secondary fill-level sensor.

* * * * *